(12) United States Patent
Kaneko et al.

(10) Patent No.: US 9,189,029 B2
(45) Date of Patent: Nov. 17, 2015

(54) INFORMATION PROCESSING UNIT

(75) Inventors: Haruka Kaneko, Kyoto (JP); Hitoshi Nakatani, Osaka (JP); Shintaro Tanaka, Osaka (JP); Yoshiaki Nagamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1383 days.

(21) Appl. No.: 12/574,252

(22) Filed: Oct. 6, 2009

(65) Prior Publication Data

US 2010/0097749 A1    Apr. 22, 2010

(30) Foreign Application Priority Data

Oct. 7, 2008    (JP) .................................. 2008-260968

(51) Int. Cl.
*G06F 1/16*    (2006.01)
*H05K 5/00*    (2006.01)
*H05K 7/00*    (2006.01)

(52) U.S. Cl.
CPC ............ *G06F 1/1656* (2013.01); *G06F 1/1601* (2013.01); *G06F 1/1616* (2013.01); *G06F 2200/1612* (2013.01)

(58) Field of Classification Search
CPC .................................................. G06F 1/161601
USPC .............. 361/679.21, 679.22, 679.26, 679.3, 361/679.55, 679.56
See application file for complete search history.

(56) References Cited

U.S. PATENT DOCUMENTS

| 5,666,261 | A * | 9/1997 | Aguilera .................. 361/679.09 |
| 7,535,698 | B2 * | 5/2009 | Iwamoto et al. ......... 361/679.55 |
| 7,782,599 | B2 * | 8/2010 | Homer et al. ............ 361/679.21 |
| 7,808,776 | B2 * | 10/2010 | Bauer et al. .............. 361/679.26 |
| 2003/0137801 | A1 * | 7/2003 | Shimada et al. .............. 361/679 |
| 2006/0232920 | A1 | 10/2006 | Miyamoto et al. |
| 2007/0211418 | A1 | 9/2007 | Iwamoto et al. |
| 2008/0232058 | A1 | 9/2008 | Horiuchi et al. |

FOREIGN PATENT DOCUMENTS

| JP | 9-062400 A | 3/1997 |
| JP | H09-282050 | 10/1997 |
| JP | 2002-278466 | 9/2002 |
| JP | 2003-204174 | 7/2003 |
| JP | 2006-085605 | 3/2006 |
| JP | 2006-293926 | 10/2006 |
| JP | 2007-272860 A | 10/2007 |
| JP | 2008-234100 | 10/2008 |

* cited by examiner

*Primary Examiner* — Anthony Haughton
(74) *Attorney, Agent, or Firm* — Hamre, Schumann, Mueller & Larson, P.C.

(57) ABSTRACT

An information processing unit of the present invention includes a display panel capable of displaying a video image; and a casing having a rear face panel that covers at least a back side of the display panel, the back side being opposite to a display face of the display panel. In the information processing unit, the rear face panel has an opposed face opposed to the display panel, and the opposed face includes a wall-thinned portion having a small thickness, and a wall-thickened portion that is a part of the wall-thinned portion having a thickness increased in a direction toward the display panel, and the wall-thickened portion is formed continuously from one side to an opposite side of the opposed face, the one side and the opposite side forming a perimeter of the opposed face and being opposite to each other.

11 Claims, 6 Drawing Sheets

INFORMATION PROCESSING UNIT

BACKGROUND OF THE INVENTION

1. Field of the Invention

The present invention relates to a display device such as a monitor used in a personal computer (hereinafter referred to as a PC) or the like, and particularly relates to an information processing unit having portability, such as a notebook PC.

2. Description of Related Art

Recently, a portable information processing unit such as a notebook PC has faced contradictory requirements: the improvement of resistance against an external force such as an impact when dropped or a static pressure, and the reduction of size and weight. An effective means of achieving the reduction of weight is to decrease a wall thickness of a casing. When a casing has a smaller wall thickness, however, the mechanical strength thereof decreases. JP 9(1997)-62400 A discloses a casing that is provided with reinforcing ribs over a front-side internal face in order to increase the mechanical strength, the reinforcing ribs being extended diagonally toward the inside. JP 2007-272860 A discloses a structure as follows: in order to increase the mechanical strength of a casing having a domed structure, reinforcing ribs that are substantially parallel in a direction in which a portion is raised for forming the domed structure are provided on internal surfaces of the casing.

A configuration in which diagonal reinforcing ribs are provided over a front-side internal face, as disclosed by JP 9(1997)-62400 A, has the following problem: in the case where an area of a casing is increased, such as the case where the area of the casing is increased as a screen size is widened, diagonal ribs increase for the increase in the area of the casing. In other words, there is a problem that a weight unavoidably increases in proportion to the area. Further, what usually is carried out in order to make the thin-walled casing resistant against an external force is to use a metal material. Still further, in the manufacturing aspect, so-called casting, in which a molten metal material is poured into a die and molded by casting, is preferable from the viewpoint of volume production. In the case where an approximately rectangular casing is formed by molding, usually a molten metal flows from one side forming a perimeter of the casing toward another side opposite thereto, and thereafter is cooled. The diagonal ribs disclosed by JP 9(1997)-62400 A, however, are formed in directions crossing the direction in which the molten metal flows (hereinafter this direction is referred to as a flow direction), and therefore the flow is hindered. This causes, for example, the molten metal to be supplied insufficiently to a downstream part with respect to the ribs in the flow direction, thereby making it difficult to achieve uniform molding. Particularly, in the case where a metal having a high melt viscosity or a metal that is easily solidified when cooled is used, it is difficult, or substantially impossible in fact, to mold a casing having ribs crossing the flow direction.

Further, as to the casing disclosed by JP 2007-272860 A, there is a possibility that ribs could come into contact with a display part when the raised part deforms in response to a static pressure applied to.

SUMMARY OF THE INVENTION

An information processing unit of the present invention includes a display panel capable of displaying a video image; and a casing having a rear face panel that covers at least a back side of the display panel, the back side being opposite to a display face of the display panel, wherein the rear face panel has an opposed face opposed to the display panel, and the opposed face includes a wall-thinned portion having a small thickness, and a wall-thickened portion that is a part of the wall-thinned portion having a thickness increased in a direction toward the display panel, and the wall-thickened portion is formed continuously from one side to an opposite side of the opposed face, the one side and the opposite side forming a perimeter of the opposed face and being opposite to each other.

DETAILED DESCRIPTION OF THE INVENTION

An information processing unit according to an embodiment of the present invention includes: a display panel capable of displaying a video image; and a casing having a rear face panel that covers at least a back side of the display panel, the back side being opposite to a display face of the display panel, wherein the rear face panel has an opposed face opposed to the display panel, and the opposed face includes a wall-thinned portion having a small thickness, and a wall-thickened portion that is a part of the wall-thinned portion having a thickness increased in a direction toward the display panel, and the wall-thickened portion is formed continuously from one side to an opposite side of the opposed face, the one side and the opposite side forming a perimeter of the opposed face and being opposite to each other.

The information processing unit according to the foregoing embodiment may be modified based on the foregoing configuration. That is, in the information processing unit according to the foregoing embodiment, it is preferable that the wall-thinned portion has a wall thickness of not less than 0.6 mm and not more than 0.8 mm. With this configuration, the weight can be reduced, while the strength against a static pressure from a direction perpendicular to a surface of the rear face panel and/or an external force applied in a bending direction can be ensured.

It should be noted that in the following explanation, unless otherwise provided specifically, "a static pressure applied in a direction perpendicular to a surface of the rear face panel" and "a bending-direction force applied in a bending direction to a surface of the rear face panel" are referred to generally as "an external force". It should be noted that the "external force"

implies "an impact when dropped" also in some cases. Further, "a strength of the rear face panel against an external force" is referred to as "robustness" in some cases.

In the information processing unit according to the foregoing embodiment, the wall-thickened portion may have an inclined face at a boundary with the wall-thinned portion. This configuration reduces the concentration of stress at a boundary between the wall-thinned portion and the wall-thickened portion when an external force is applied to the rear face panel, whereby deformation of the rear face panel can be suppressed.

The information processing unit according to the foregoing embodiment may have a pair of long sides and a pair of short sides, the long sides and the short sides forming the perimeter of the opposed face, wherein the wall-thickened portion is formed so as to extend from one long side to the other long side of the pair. With this, it is possible to form a decreased-weight configuration capable of suppressing deformation of the rear face panel when an external force is applied to the rear face panel. Further, it is possible to decrease a distance through which a molten material is caused to flow in a mold along a boundary between the wall-thinned portion and the wall-thickened portion when the rear face panel is being molded. Therefore, excellent flow can be provided, whereby a high-quality rear face panel can be produced stably.

The information processing unit according to the foregoing embodiment may have a pair of long sides and a pair of short sides, the long sides and the short sides forming the perimeter of the opposed face, wherein the wall-thickened portion is formed so as to extend from one short side to the other short side of the pair. With this configuration, it is possible to suppress deformation of the rear face panel when an external force is applied thereto. Particularly when an area of the rear face panel is enlarged as the effective display area of the display part is widened and/or enlarged, the robustness can be ensured.

The information processing unit according to the foregoing embodiment may be modified so that the rear face panel has a raised part that is raised with a level-difference portion being interposed therebetween, the level-difference portion being continuous from the one side to the opposite side of the opposed face, the opposed face in the raised part has a greater distance therefrom to the display panel than a distance from the wall-thinned portion to the display panel, and the wall-thickened portion is formed in the raised part. With this configuration, a domed structure as seen in a hood of a car or the like can be added to an outer shape of the rear face panel, whereby deformation of the rear face panel when an external force is applied thereto can be suppressed.

The information processing unit according to the foregoing embodiment may be modified so that the wall-thickened portion is formed in the raised part, along an intersection line portion of the raised part and the level-difference portion. With this configuration, deformation occurring in the raised part when an external force is applied to the raised part can be suppressed at the intersection line portion, whereby the robustness of the raised part as a whole against an external force can be ensured.

The information processing unit according to the foregoing embodiment may be modified so that the raised part has the wall-thickened portion substantially at a midpoint between a pair of opposite intersection portions. With this configuration, robustness against an external force applied to substantially the center of the raised part can be ensured.

Embodiment

1. Configuration of Information Processing Unit

Figure 1:
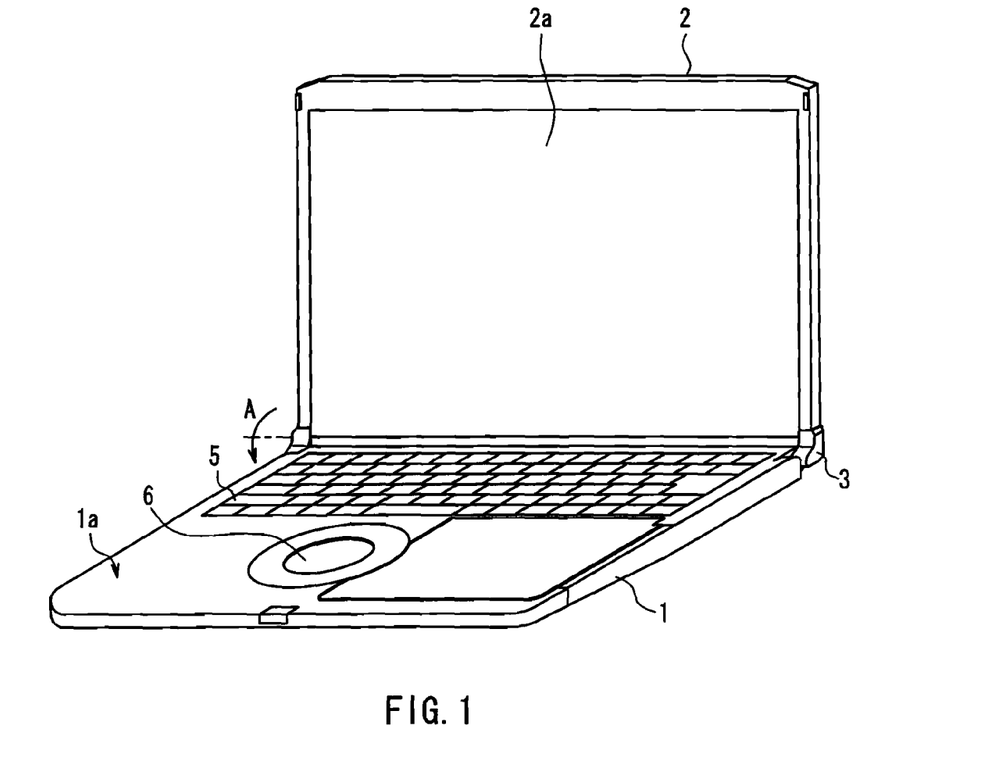
FIG. 1 is a perspective view illustrating an appearance of an information processing unit in an embodiment of the present invention (first state).
Figure 2:
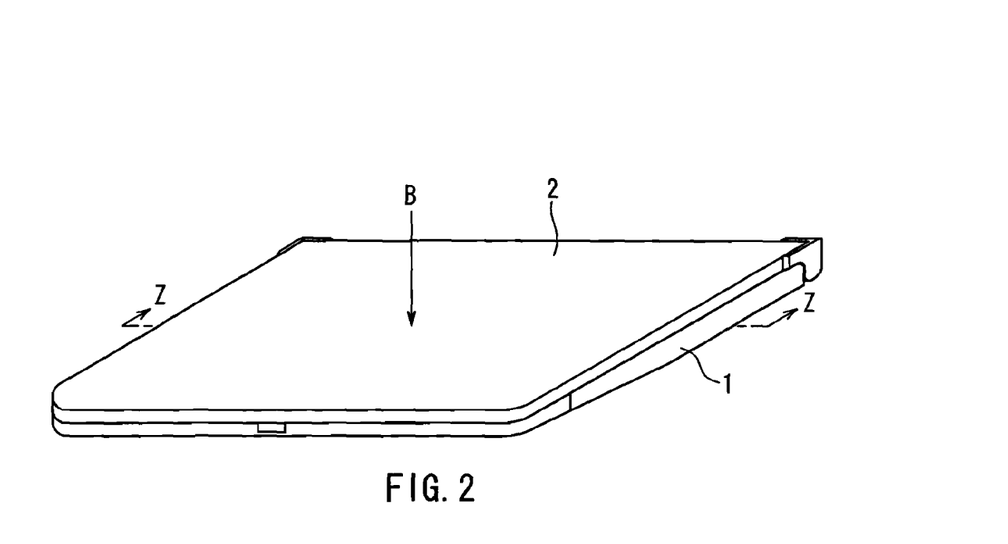
FIG. 2 is a perspective view illustrating an appearance of an information processing unit in an embodiment of the present invention (second state).

FIG. 1 is a perspective view illustrating an appearance of a notebook PC as an example of an information processing unit of the present embodiment. FIG. 2 is a perspective view illustrating a folded state of the notebook PC. It should be noted that as to the present embodiment, a case where a notebook PC is applied as an exemplary information processing unit is described, but any portable information processing unit may be applied, such as a portable telephone terminal or a portable game machine, which are required to have at least so-called robustness such as resistance to an impact when dropped and/or resistance to a static pressure.

As shown in FIG. 1, the notebook PC has a first casing 1 and a second casing 2. The first casing 1 incorporates a circuit board and an information processing circuit on which various types of electric elements are mounted, a hard disk drive, and the like. The second casing 2 has a liquid crystal display 2a. The first casing 1 and the second casing 2 are supported pivotally by a hinge mechanism incorporated in a hinge portion 3. When the second casing 2 is pivoted from a position (first state) shown in FIG. 1 in a direction indicated by an arrow A, the second casing 2 shifts to a position at which the liquid crystal display 2a closely faces a keyboard 5 (second state) as shown in FIG. 2. When a face of the first casing 1 that faces the second casing 2 in the second state is defined as a "top" side, the first casing 1 includes the keyboard 5 and a pointing device 6 on a top face 1a thereof. The keyboard 5 allows a user to perform an operation of entering various characters. The pointing device 6 allows a user to perform an operation of moving a cursor displayed on the liquid crystal display 2a to a desired position. It should be noted that information signals entered with the keyboard 5 and information signals outputted from a storage medium such as a hard disk drive are subjected to predetermined processing operations at an information processing circuit so as to be converted into, for example, display signals for display on the liquid crystal display 2a.

Figure 3:
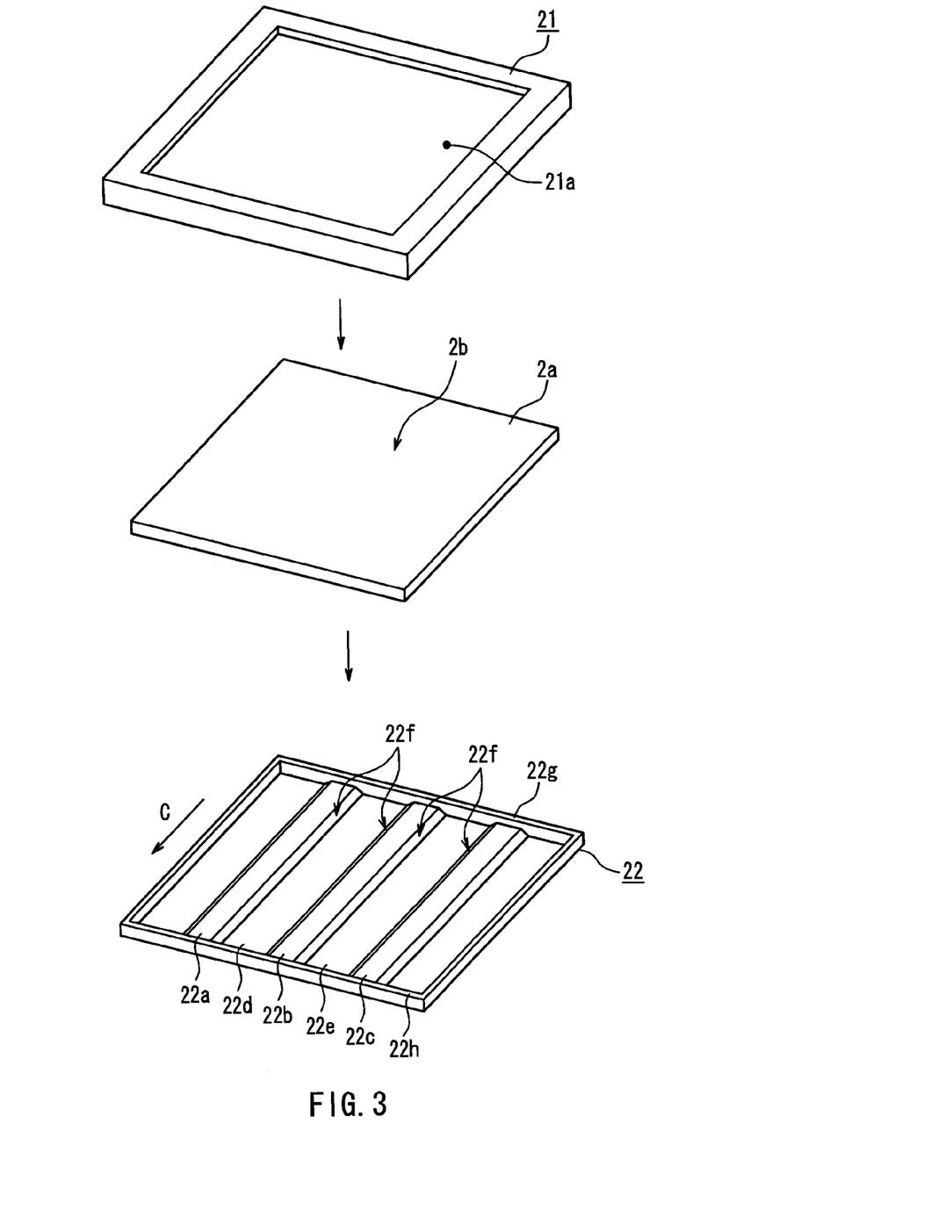
FIG. 3 is an exploded perspective view of a second casing.
Figure 4:
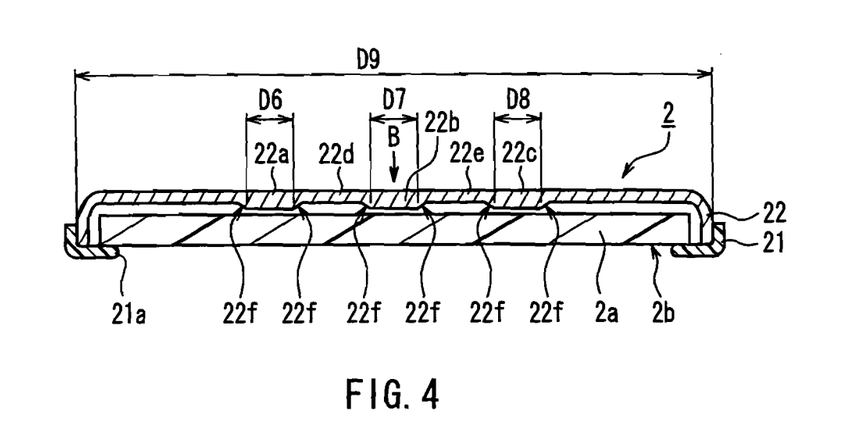
FIG. 4 is a cross-sectional view taken along a line Z-Z in FIG. 2.

FIG. 3 is an exploded perspective view of the second casing 2. FIG. 4 is a cross-sectional view taken along a line Z-Z in FIG. 2. As shown in FIGS. 3 and 4, the second casing 2 has a front face panel 21, a rear face panel 22, and the liquid crystal display 2a.

The liquid crystal display 2a is interposed between the front face panel 21 and the rear face panel 22. The liquid crystal display 2a has an aspect ratio of an effective display area set at, for example, 4:3. It should be noted that instead of the liquid crystal display 2a, any another display may be provided as long as it has a small wall thickness, such as a plasma display or an organic electroluminescence display.

The front face panel 21 has a rectangular opening 21a. The opening 21a is intended to allow a video image displayed on a display face 2b of the liquid crystal display 2a to be visible from the outside. The front face panel 21 is formed of a resin in the present embodiment, but may be formed of a metal such as magnesium.

The rear face panel 22 is a casing that covers a back side of the liquid crystal display 2a, the back side being opposite to the display face 2b thereof. The rear face panel 22 preferably is formed of a metal such as aluminum, an aluminum alloy, magnesium, or a magnesium alloy, in order surely to have a light weight, a high mechanical strength, electromagnetic wave shielding properties, and heat dissipation properties. In the present embodiment, the rear face panel 22 is formed of a magnesium alloy that is relatively excellent regarding the foregoing properties. The rear face panel 22 has wall-thinned portions 22d and 22e as well as wall-thickened portions 22a, 22b, and 22c, on its opposed face that is opposed to the back side of the liquid crystal display 2a opposite to the display face 2b thereof. The wall-thickened portions 22a, 22b, and 22c have a greater thickness than that of the wall-thinned portions 22d and 22e. The wall-thickened portions 22a to 22c are formed in an elongated shape extending from one side 22g forming a perimeter of the rear face panel 22 to an opposite side 22h that is opposite to the side 22g, as shown in FIG. 3. The wall-thickened portions 22a to 22c are each in a shape having a lengthwise direction substantially parallel to a direction in which short sides of the rear face panel 22 extend. Further, the wall-thickened portions 22a to 22c are formed continuous from the side 22g to the opposite side 22h. Still further, the ends of the wall-thickened portions 22a to 22c on one side in the lengthwise direction reach the side 22g, while the other ends thereof on the other side in the lengthwise direction reach the opposite side 22h.

The inventors carried out experiments regarding the robustness in the case where the aforementioned metal material was used for forming the rear face panel 22. The results of the same proved the following. In the case where the aforementioned metal material is used for forming the rear face panel 22, the wall-thinned portions 22d and 22e preferably have a wall thickness D2 shown in FIG. 5 of not less than 0.6 mm, with the robustness being taken into consideration. Further, the rear face panel 22 can satisfy the requirement of robustness when the wall-thinned portions 22d and 22e have a wall thickness D2 of not less than 0.6 mm. In order to reduce the weight of the rear face panel 22, thickness D2 of the wall-thinned portions 22d and 22e preferably is as small as possible, but from the viewpoint of robustness, the wall thickness D2 preferably is not more than 0.8 mm.

Figure 5:
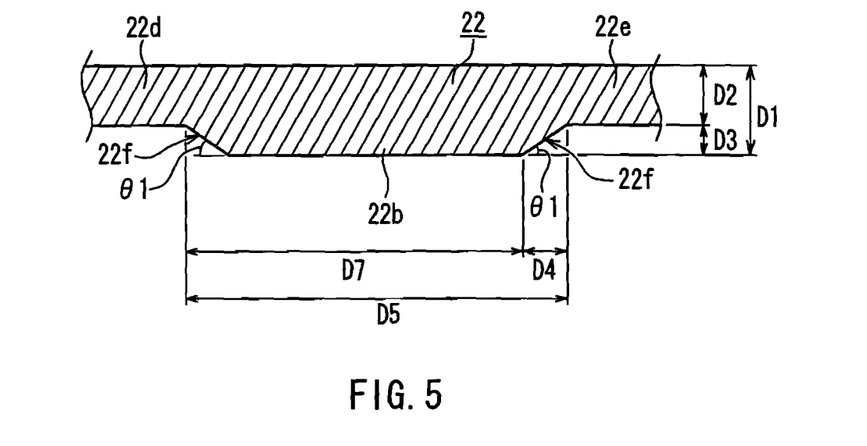
FIG. 5 is a cross-sectional view illustrating principal parts in the vicinity of a thick-walled portion.

Further, as to a ratio R1 between a thickness-direction height D3 and the thickness D2 shown in FIG. 5 (R1=D3/D2), where D3 is a thickness-direction height of the wall-thickened portions 22a to 22c from the opposed face of the wall-thinned portions 22d and 22e, and D2 is the thickness of the wall-thinned portions 22d and 22e, a preferable value of the ratio R1 varies depending on the number of the wall-thickened portions 22a to 22c arranged on the rear face panel 22, and/or a width D5 thereof. When the ratio R1 was less than 0.35, experiments were carried out regarding a case where D3 was decreased and a case where D2 was increased. According to results of the experiments, no effect of improving the robustness of the rear face panel 22 was observed, even in the configuration with the three wall-thickened portions 22a to 22c on the rear face panel 22 as shown in FIG. 4. When the ratio R1 is greater than 0.75, experiments were carried out regarding a case where D2 was decreased and a case where D3 was increased. According to results of these experiments, when D2 was decreased, the wall-thinned portion 22d was weakened, and a tendency of deteriorated robustness of the rear face panel 22 was observed. When D3 was increased in contrast, a tendency toward an increase in the weight of the rear face panel 22, and/or a tendency for a sink to occur in the wall-thickened portion 22b was observed. Therefore, it is preferable that the ratio R1 is set as follows:

$$0.35 \leq R1 \leq 0.75.$$

The inventors also confirmed that a ratio R2 between a total width Da of flat surfaces of the wall-thickened portions 22a to 22c (Da=D6+D7+D8) and a width D9 of the entire rear face panel 22 (R2=Da/D9) preferably is not less than about 0.15, though this depends on the number of the wall-thickened portions 22a to 22c arranged thereon, and the density thereof.

Further, along boundaries between the wall-thickened portions 22a to 22c and the wall-thinned portions 22d and 22e, inclined faces 22f are provided so that the thickness of the rear face panel 22 continuously changes. For example, in a rear face panel in which the thickness of the wall-thickened portions 22a to 22c and the thickness of the wall-thinned portions 22d and 22e changes discontinuously (i.e., a rear face panel in which the wall-thickened portions 22a to 22c and the wall-thinned portions 22d and 22e are connected with each other by flat-plane portions substantially perpendicular to those both of them), sinks tend to occur easily, and fractures tend to occur at boundaries between wall-thickened portions and wall-thinned portions when, for example, a static pressure is applied in a direction as indicated by an arrow B shown in FIG. 4. It should be noted that in order to achieve the robustness at the same level as that in the present embodiment by adjusting the overall thickness of the rear face panel 22, the thickness of wall-thickened portions was required to be approximately twice the thickness of the wall-thinned portions 22d and 22e of the present invention.

In the present embodiment, a magnesium alloy is used for forming the rear face panel 22, the thickness D1 of the wall-thickened portion 22b shown in FIG. 5 is set at 1.1 mm, and the thickness D2 of the wall-thinned portions 22d and 22e is set at 0.8 mm. As a result, the thickness-direction height D3 between the wall-thickened portion 22b and the wall-thinned portions 22d and 22e (D3=D1−D2) shown in FIG. 5 is set at 0.3 mm. Further, though FIG. 5 illustrates a cross-sectional view of principal parts only in the vicinity of the wall-thickened portion 22b, the thicknesses of the wall-thickened portions 22a and 22c are identical to the above-described D1. It should be noted that the foregoing values are merely illustrative.

Further, at boundaries between the wall-thickened portions 22a to 22c and the wall-thinned portions 22d and 22e, inclined faces 22f are formed so that the thickness of the rear face panel 22 continuously changes. Further, the inclined faces 22f are formed continuously in the lengthwise direction of the wall-thickened portions 22a to 22c, as shown in FIG. 3. Still further, a width D4 of the inclined face 22f shown in FIG. 5 is set at 10 mm in the present embodiment. Therefore, an inclination angle θ1 of the inclined face 22f is approximately 1.72 degrees.

In the present embodiment, as shown in FIG. 4, the wall-thickened portion 22b on the internal face of the rear face panel 22 is positioned substantially at the center in the longer side direction of the rear face panel 22, and the wall-thickened portions 22a and 22c are in the vicinity of ends in the longer side direction of the rear face panel 22. This positioning, however, may be modified appropriately. According to the outer dimensions of the rear face panel 22 or the like, for example, only the wall-thickened portions 22a and 22c are provided, with the wall-thickened portion 22b being omitted. It should be noted that a ratio between a distance between outer edges of flat portions of the wall-thickened portions 22a and 22c and a lengthwise length of the rear face panel 22 preferably is about 1:2.

When a static pressure in a direction indicated by an arrow B shown in FIG. 2 is applied to the second casing 2 of the present embodiment, the rear face panel 22 having a configuration in which the second casing 2 is provided with the wall-thickened portions 22a to 22c as in the present embodiment has a higher cross-sectional secondary moment, thereby having a smaller amount of deformation, as compared with a configuration in which a casing is not provided with a wall-thickened portion. Therefore, the strength of the second casing 2 can be increased, whereby damage to the liquid crystal display 2a incorporated in the second casing 2 can be prevented even if a large static pressure is applied in the direction indicated by the arrow B. In other words, even if a static pressure in the direction indicated by the arrow B shown in FIG. 2 is applied to the second casing 2, the wall-thickened portions 22a to 22c and the like hardly come into contact with the liquid crystal display 2, or even if they come into contact, no significant static pressure is applied to the liquid crystal display 2a. Therefore, damage to the liquid crystal display 2a can be prevented.

Further, in the present embodiment, the configuration in which the inclined faces 22f are formed at the boundaries between the wall-thickened portions 22a to 22c and the wall-thinned portions 22d and 22e makes the following possible: even if a strong external force in the direction indicated by the arrow B is applied to the rear face panel 22 and the rear face panel 22 deforms significantly in the direction indicated by the arrow B, stress applied to the boundaries can be dispersed, whereby deformation occurring at the boundaries can be suppressed. In contrast, if the wall-thickened portions 22a to 22c and the wall-thinned portions 22d and 22e are connected by wall faces substantially perpendicular to both of them, stress is concentrated at the boundaries between the wall faces and the wall-thickened portions 22a to 22c or between the wall faces and the wall-thinned portions 22d and 22e (substantially perpendicularly crossing portions), and deformation possibly could occur partially at the boundaries (step-like portions).

It should be noted that, for simplification of explanation, the static pressure is referred to as an example of the external force in the foregoing explanation, but the same basic concept as that for the static pressure applies to the case where the external force is a force in a bending direction and/or an impact when dropped.

2. Method for Producing Rear Face Panel 22

The rear face panel 22 of the present embodiment is molded by casting a magnesium alloy. In the case where the rear face panel 22 is molded by casting, a molten material of a magnesium alloy is poured into a mold (not shown) via a sprue (not shown) provided on one side 22g of the rear face panel 22. It should be noted that the sprue is an opening through which the molten material is poured into the mold, but the illustration of the same is omitted since it is removed after the molding of the rear face panel 22. Examples of a method for pouring the molten material include a method of injecting the material in a direction indicated by an arrow C as shown in FIG. 3, via a sprue provided on the one side 22g of the rear face panel 22. The molten material thus poured into the mold flows from the side 22g to another side 22h opposite to the side 22g. Then, after the molten material is filled in the mold, the molten material is cooled so as to be solidified. Next, the solidified material is removed from the mold, and subjected to the surface finishing and the cutting for removing unnecessary portions, whereby the rear face panel 22 is completed.

Here, a flowing speed of the molten material flowing through areas where the wall-thickened portions 22a to 22c are to be formed in this mold is higher than a flowing speed of the molten material flowing through areas where the wall-thinned portions 22d and 22e are to be formed, and accordingly the molten material flowing through the areas for the wall-thickened portions 22a to 22c arrives at the side 22h first. Therefore, sometimes the molten material flowing through the areas for the wall-thickened portions 22a to 22c leaks to the areas for the wall-thinned portions 22d and 22e and are cooled first, and thereby is solidified. Then, the molten material flowing through the areas for the wall-thinned portions 22d and 22e is bonded to the molten material that leaks out of the areas for the wall-thickened portions 22a to 22c and is cooled and solidified, whereby the flow of the molten material through the areas for the wall-thinned portions 22d and 22e is hindered. Since the molten material leaking from the areas for the wall-thickened portions 22a to 22c has been cooled and solidified before being bonded with the molten material having flown through the areas for the wall-thinned portions 22d and 22e, a weld consequently occurs between the molten material having flowed through the areas for the wall-thinned portions 22d and 22e and the molten material having leaked from the areas for the wall-thickened portions 22a to 22c. This weld sometimes appears on a surface of the finished rear face panel 22, too. Such occurrence of weld on a surface of a product casing such as the rear face panel 22 could significantly degrade the quality of the product. Therefore, a processing operation for hiding weld is required.

In the present embodiment, an overflow portion (not shown) is provided on an extension line in the direction in which the molten material flows through the areas for the wall-thickened portions 22a to 22c. The overflow portion is an opening for allowing the molten material in the area for the wall-thickened portions 22a to 22c to go out of the mold. With the overflow portion, the molten material flowing through the area for the wall-thickened portions 22a to 22c by no means leaks to the areas for the wall-thinned portions 22d and 22e, whereby the occurrence of welding to the wall-thinned portions 22d and 22e can be prevented.

Further, as shown in FIG. 5, in the rear face panel 22 of the present embodiment, the level difference D3 between the wall-thickened portions 22a to 22c and the wall-thinned portions 22d and 22e is set at 0.3 mm, and the inclined faces 22f are provided. The inventors of the present invention carried out experiments in which the level difference D3 between the wall-thickened portions 22a to 22c and the wall-thinned portions 22d and 22e was set at various values. As a result, they confirmed that when the level difference D3 exceeded 0.6 mm and the thickness D1 of the wall-thickened portions 23a to 23c exceeded 1.4 mm, the wall-thickened portions 22a to 22c shrank, thereby having sinks, after the molding by casting of the rear face panel 22. When such sinks appear on a surface of the casing, it is necessary to perform a processing operation with respect to the surface of the casing for smoothing the surface by grinding or the like, according to the depth of the sinks. Therefore, the sinks cause the number of the processing steps to increase, thereby increasing the costs of producing products. They also confirmed that the mechanical strength of the rear face panel 22 could be ensured when the level difference D3 was set at 0.21 mm or more. Therefore, the level difference D3 preferably is set in a range of 0.21 mm to 0.6 mm so that the mechanical strength of the rear face panel 22 can be ensured while the occurrence of sinks can be suppressed.

Further, in the present embodiment, the width D5 of the wall-thickened portions 22a to 22c is set at 20.0 mm. This width D5 is a width at least at the center of the wall-thickened portions 22a to 22c in the lengthwise direction.

3. Exemplary Modification of Rear Face Panel 22

The rear face panel 22 shown in FIG. 3 or the like has such a configuration that a portion thereof facing the liquid crystal display 2a is substantially in a flat-plate form. However, it may be a rear face panel in a shape with a part in the vicinity of the center thereof being raised, on which the wall-thickened portions of the present embodiment are formed, as disclosed by JP 2003-204174 A (corresponding to U.S. Pat. No. 6,992,335).

Figure 6:
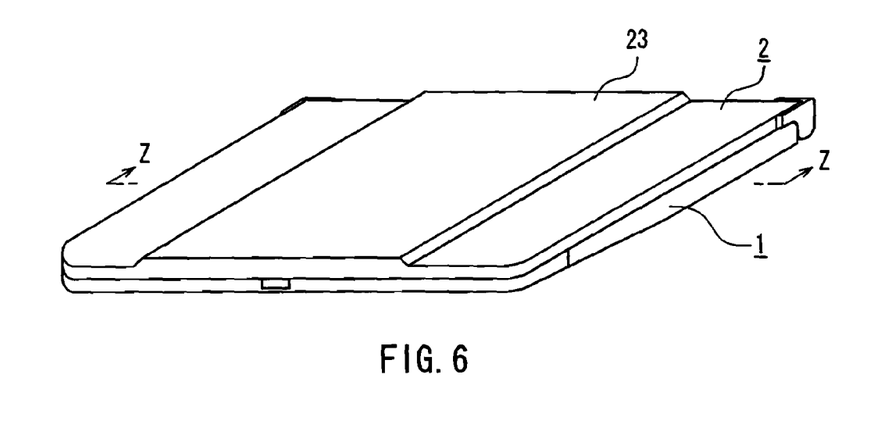
FIG. 6 is a perspective view illustrating another exemplary configuration of an information processing unit of an embodiment of the present invention.

FIG. 6 is a perspective view of a notebook PC having a rear face panel in a shape with a part in the vicinity of the center thereof being raised. In FIG. 6, the same constitutional elements as those shown in FIGS. 1 to 5 are designated by the same reference numerals, and descriptions of the same are omitted herein. As shown in FIG. 6, the rear face panel 22 has a raised portion 23 on a rear face side of the second casing 2 (when a side of the second casing 2 on which the display face 2b of the liquid crystal display 2a is arranged is assumed to be a "front face", the rear face is a face on a back side with respect to the front face).

Figure 7A:
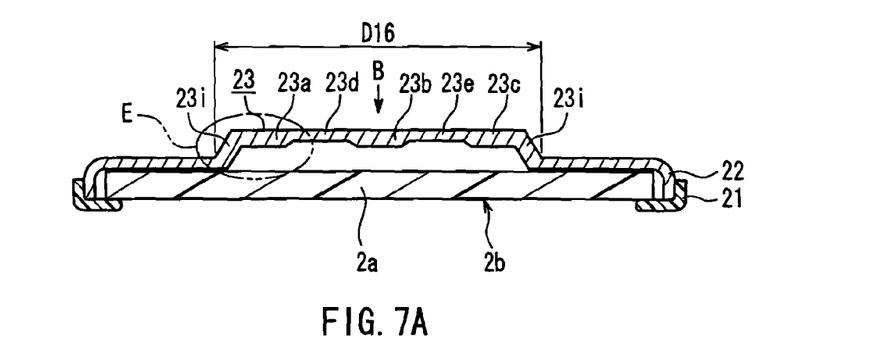
FIG. 7A is a cross-sectional view taken along a line Z-Z in FIG. 6.
Figure 7B:
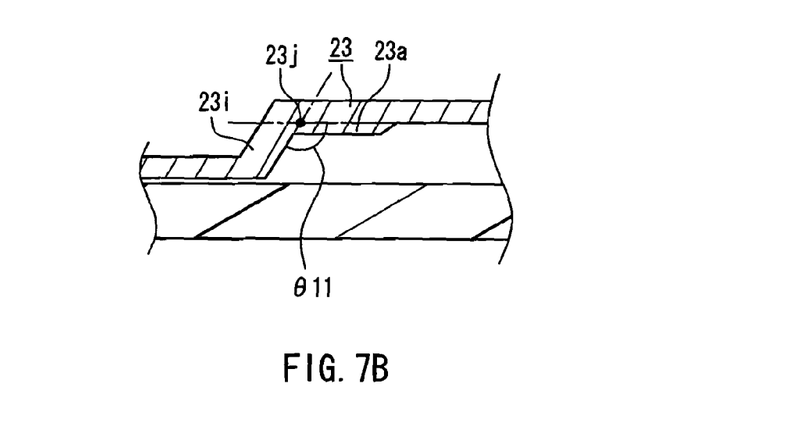
FIG. 7B is an enlarged view of a portion E in FIG. 7A.
Figure 8:
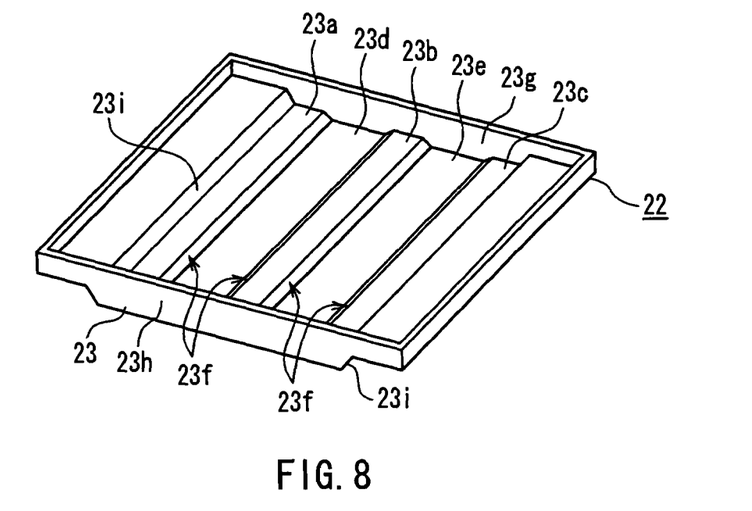
FIG. 8 is a perspective view illustrating a rear face panel.
Figure 9:
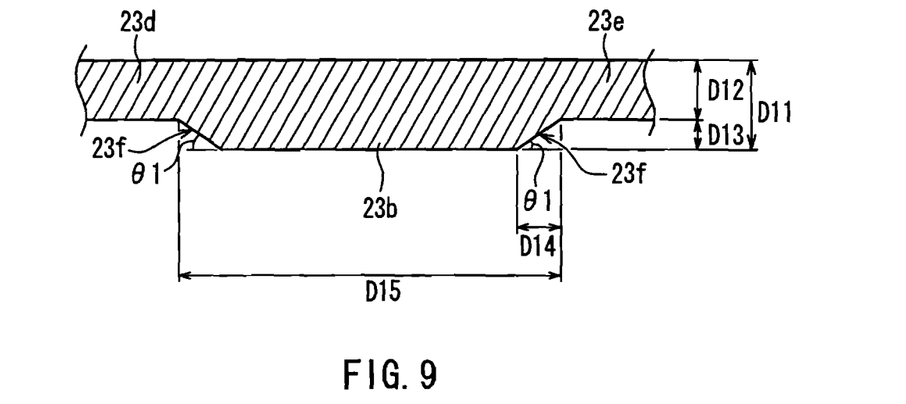
FIG. 9 is a cross-sectional view of principal parts in the vicinity of a wall-thickened portion.

FIG. 7A is a cross-sectional view taken along a line Z-Z in FIG. 6. FIG. 7B is an enlarged view of a portion E in FIG. 7A. FIG. 8 is a perspective view of the rear face panel 22 constituting a perimeter of the second casing 2. FIG. 8 is a view illustrating the inside of the rear face panel 22. FIG. 9 is a cross-sectional view of principal parts in the vicinity of the wall-thickened portion 23b in FIG. 7A.

As shown in FIGS. 7A to 9, the wall-thickened portions 23a to 23c are provided on an inner face of a raised part 23. The wall-thickened portions 23a to 23c are formed so as to have a lengthwise direction along a short-side direction of the rear face panel 22, like the wall-thickened portions 22a to 22c shown in FIGS. 3 and 4. In other words, the wall-thickened portions 23a to 23c are provided continuously from the side 22g to the opposite side 22h of the rear face panel 22. Ends of the wall-thickened portions 22a to 22c on one side in the lengthwise direction reach the side 22g, while the other ends thereof on the other side in the lengthwise direction reach the opposite side 22h. Further, the wall-thickened portions 23a and 23c are formed at portions of the raised part 23 along intersection line portions 23j as boundaries between the raised part 23 and level-difference portions 23i, as shown in FIG. 7B. It should be noted that alternate long and short dashed lines in FIG. 7B are lines schematically showing the boundaries of the raised part 23, the wall-thickened portion 23a, and the level-difference portion 23i, and this does not mean that there would be concrete boundaries among areas of the raised part 23, the wall-thickened portions 23a, and the level-difference portion 23i. The level-difference portion 23i is formed at each of the ends of the raised part 23 in the lengthwise direction of the rear face panel 22. The level-difference portion 23i may cross the raised part 23 perpendicularly, or may be cross the raised part 23 at an angle greater than 90 degrees. At boundaries between the wall-thickened portions 23a to 23c and the wall-thinned portions 23d and 23e, inclined faces 23f are formed. Preferably a level difference D13 between the wall-thickened portions 23a to 23c and the wall-thinned portions 23d and 23e (D13=D11−D12) is set at 0.21 mm to 0.6 mm.

The inventors carried out experiments regarding the robustness in the case where the above-described metal material was used for forming the rear face panel 22. The results show that when the above-described metal material was used for forming the rear face panel 22, a wall thickness D12 of the wall-thinned portions 23d and 23e shown in FIG. 9 preferably is not less than 0.6 mm, with the robustness being taken into consideration. Further, the rear face panel 22 can satisfy the requirement of robustness when the wall-thinned portions 23d and 23e have a wall thickness D12 of not less than 0.6 mm. In order to reduce the weight of the rear face panel 22, the thickness D12 of the wall-thinned portions 23d and 23e preferably is as small as possible, but the wall thickness D12 preferably is not more than 0.8 mm, from the viewpoint of robustness.

Further, as to a ratio R11 between a thickness-direction height D13 and a thickness D12 (R11=D13/D12) shown in FIG. 9, where D13 is a thickness-direction height of the wall-thickened portions 23a to 23c from the opposed face of the wall-thinned portions 23d and 23e, and D12 is a thickness of the wall-thinned portions 23d and 23e, a preferable value of the ratio R11 varies depending on the number of the wall-thickened portions 23a to 23c arranged on the rear face panel 22, and/or a width D15 thereof. When the ratio R11 was less than 0.35, experiments were carried out regarding a case where D13 was decreased and a case where D12 was increased. According to results of the experiments, no effect of improving the robustness of the rear face panel 22 was observed, even in the configuration with the three wall-thickened portions 23a to 23c on the rear face panel 22 as shown in FIG. 9. When the ratio R11 was greater than 0.75, experiments were carried out regarding a case where D12 was decreased and a case where D13 was increased. According to results of these experiments, when D12 was decreased, the wall-thinned portion 23d was weakened, and a tendency of deteriorated robustness of the rear face panel 22 was observed. When D13 was increased in contrast, a tendency of deteriorated lightness in weight of the rear face panel 22, and/or a tendency of a sink occurring to the wall-thickened portion 23b was observed. Therefore, it is preferable that the ratio R11 be set as follows:

$$0.35 \leq R11 \leq 0.75.$$

Further, along boundaries between the wall-thickened portions 23a to 23c and the wall-thinned portions 23d and 23e, inclined faces 23f are provided so that the thickness of the rear face panel 22 continuously changes. For example, in a rear face panel in which the thickness of the wall-thickened portions 23a to 23c and the thickness of the wall-thinned portions 23d and 23e changes discontinuously (i.e., a rear face panel in which the wall-thickened portions 22a to 22c and the wall-thinned portions 22d and 22e are connected with each other by flat-plane portions substantially perpendicular to both of them), sinks tend to occur easily, and fractures tend to occur at boundaries between wall-thickened portions and wall-thinned portions when, for example, a static pressure is applied in a direction as indicated by an arrow B shown in FIG. 7A. It should be noted that in order to achieve the robustness at the same level as that in the present embodiment by adjusting the overall thickness of the rear face panel 22, the thickness of wall-thickened portions was required to be approximately twice the thickness of the wall-thinned portions 23d and 23e of the present invention.

In the present embodiment, a magnesium alloy is used for forming the rear face panel 22, the thickness D11 of the wall-thickened portion 23b shown in FIG. 9 is set at 1.1 mm, and the thickness D12 of the wall-thinned portions 23d and 23e is set at 0.8 mm. As a result, the thickness-direction height D13 between the wall-thickened portion 23b and the wall-thinned portions 23d and 23e shown in FIG. 9 (D13=D11−D12) is set at 0.3 mm. Further, though FIG. 9 illustrates a cross-sectional view of principal parts in the vicinity of the wall-thickened portion 23b, the thicknesses of the wall-thickened portions 23a and 23c are identical to the above-described D11. It should be noted that the foregoing values are merely illustrative.

Further, at boundaries between the wall-thickened portions 23a to 23c and the wall-thinned portions 23d and 23e, inclined faces 23f are formed so that the thickness of the rear face panel 22 continuously changes. Further, the inclined faces 23f are formed continuously in the lengthwise direction of the wall-thickened portions 23a to 23c, as shown in FIG. 8. Still further, a width D14 of the inclined face 23f shown in FIG. 9 is set at 10.0 mm in the present embodiment. Therefore, an inclination angle θ1 of the inclined face 22f is approximately 1.72 degrees.

In the present embodiment, as shown in FIG. 8, the wall-thickened portion 23b on the internal face of the rear face panel 22 is positioned substantially at the center in the longer side direction of the rear face panel 22, and the wall-thickened portions 23a and 23c are in the vicinity of ends in the longer side direction of the rear face panel 22. This positioning, however, may be modified appropriately. According to the outer dimensions of the rear face panel 22 or the like, for example, only the wall-thickened portions 23a and 23c are provided, with the wall-thickened portion 23b being omitted. It should be noted that a ratio between a distance between outer edges of flat portions of the wall-thickened portions 23a and 23c and a lengthwise length of the rear face panel 22 preferably is about 1:2.

When a static pressure in a direction indicated by an arrow B shown in FIG. 7A is applied to the second casing 2 of the present embodiment, the rear face panel 22 having a configuration in which the second casing 2 is provided with the wall-thickened portions 23a to 23c as in the present embodiment has a higher cross-sectional secondary moment, thereby having a smaller amount of deformation, as compared with a configuration in which a casing is not provided with a wall-thickened portion. Therefore, the strength of the second casing 2 can be increased, whereby damage to the liquid crystal display 2a incorporated in the second casing 2 can be prevented even if a large static pressure is applied in the direction indicated by the arrow B. In other words, even if a static pressure in the direction indicated by the arrow B shown in FIG. 2 is applied to the second casing 2, the rear face panel 22 does not deform significantly. Therefore, the wall-thickened portions 22a to 22c and the like hardly come into contact with the liquid crystal display 2, or even if they come into contact, a great static pressure hardly is applied to the liquid crystal display 2a. Therefore, damage to the liquid crystal display 2a can be prevented.

Further, in the present embodiment, the configuration in which the inclined faces 23f are formed at the boundaries between the wall-thickened portions 23a to 23c and the wall-thinned portions 23d and 23e makes the following possible: even if a large static pressure in the direction indicated by the arrow B is applied to the rear face panel 22 and the rear face panel 22 deforms significantly in the direction indicated by the arrow B, stress applied to the boundaries can be dispersed, whereby deformation occurring at the boundaries can be suppressed. In contrast, if the wall-thickened portions 23a to 23c and the wall-thinned portions 23d and 23e are connected by wall faces substantially perpendicular to both of them, stress is concentrated at the boundaries between the wall faces and the wall-thickened portions 23a to 23c or between the wall faces and the wall-thinned portions 23d and 23e (substantially perpendicularly crossing portions), and deformation possibly could occur locally at the boundaries (step-like portions).

It should be noted that the above-described behavior at the boundaries exhibits completely the same effect at the level-difference portions 23i also. Moreover, with the level-difference portions 23i provided, the robustness of the rear face panel 22 can be improved more surely.

The present embodiment makes it possible to improve the mechanical strength of the rear face panel 2 and the second casing 2 including the same. Further, it also makes it possible to suppress the occurrence of sinks after the molding by casting.

4. Effects of Embodiment, and the Others

According to the present embodiment, with the wall-thickened portions 22a to 22c provided on an internal face of the rear face panel 22, the robustness of the rear face panel 22 is improved. With the wall-thinned portions 22d and 22e formed locally, the weight of the rear face panel 22 can be decreased, as compared with a configuration having wall-thickened portions over an entirety of the rear face panel 22. Further, the same effect can be achieved with the wall-thickened portions 23a to 23c and the wall-thinned portions 23d and 23e.

Besides, with the wall-thickened portions 22a to 22c on the internal face of the rear face panel 22, the deformation in the direction indicated by the arrow B is suppressed, the deformation occurring when a static pressure is applied to the rear face panel 22 in the direction indicated by the arrow B. Therefore, the internal face of the rear face panel 22 (particularly the wall-thickened portions 22a to 22c) hardly comes into contact with the liquid crystal display 2a, or even if they come into contact, no significant pressure is applied to the liquid crystal display 2a. Therefore, damage to the liquid crystal display 2a can be prevented. The same effect can be achieved with the wall-thickened portions 23a to 23c.

Further, the inclined faces 22f provided at the boundaries between the wall-thickened portions 22a to 22b and the wall-thinned portions 22d and 22e make it possible to, when an external force is applied to the rear face panel 22 in the direction indicated by the arrow B, prevent stress from being concentrated around the vicinities of the wall-thickened portions 22a to 22c. Therefore, the robustness of the rear face panel 22 can be improved. The same effect can be achieved with the wall-thickened portions 23a to 23c, the wall-thinned portions 23d and 23e, and the inclined faces 23f.

Further, with the configuration in which the level difference D3 between the wall-thickened portions 22a to 22c and the wall-thinned portions 22d and 22e is set in a range from 0.21 mm to 0.6 mm, and the inclined faces 22f are formed at boundaries between the wall-thickened portions 22a to 22c and the wall-thinned portions 22d and 22e, the occurrence of sinks in the wall-thickened portions 22a to 22c after the molding by casting of the rear face panel 22 can be suppressed. Therefore, a loss of molding yield can be suppressed. Further, a finishing process for removing sinks is unnecessary, whereby the manufacturing costs can be reduced. Still further, the same effect can be achieved with the wall-thickened portions 23a to 23c, the wall-thinned portions 23d and 23e, and the inclined faces 23f.

Further, a molten material is allowed to flow smoothly in the mold, in the case where the lengthwise direction of the wall-thickened portions 22a to 22c and the flow direction in the molding by casting are oriented in the same direction. Therefore, the molding can be performed using a material having a high melt viscosity or a material that easily is solidified when cooled. In other words, the configuration of the present embodiment having the wall-thickened portions 22a to 22c has an advantage of a high degree of freedom in the selection of a material for the rear face panel 22. Particularly, the configuration having the wall-thickened portions 22a to 22c parallel to the short-side direction of the rear face panel 22 as shown in FIG. 3 is preferable, since this configuration makes the distance of flow of the molten material short, thereby smoothing the flow.

Further, with the wall-thickened portions 23a to 23c provided on the raised part 23 of a domed structure as shown in FIGS. 6 to 9, the robustness of the raised part 23 can be improved. More specifically, there is the following tendency: as shown in FIG. 7A, the greater a width D16 of the raised part 23 is, the strength against a static pressure in the vicinity of the center of the raised part 23, for example, decreases, whereby the raised part 23 becomes weaker. With the wall-thickened portions 23a to 23c in the raised part 23 as shown in FIGS. 7A and 8, the strength against a static pressure in the vicinity of the center of the raised part 23 can be improved. Particularly, the wall-thickened portions 23b are capable of suppressing deformation of the raised part 23 in the vicinity of the center. These phenomena also appear against an impact when dropped and a force in a bending direction.

Further, with the wall-thickened portion 23a provided along the intersection line portion 23j as a portion of line of intersection of the raised part 23 and the level-difference portion 23i as shown in FIGS. 7B and 8, the overall robustness of the raised part 23 can be improved. For example, the arrangement of the wall-thickened portion 23a along the intersection line portion 23j of the raised part 23 and the level-difference portion 23i makes it possible to suppress a decrease in an angle θ11 formed by the raise part 23 and the level-difference portion 23i when a static pressure is applied to the rear face panel 22 in the direction indicated by the arrow B. Further, the arrangement of the wall-thickened portion 23c along a portion of line of intersection of the raised part 23 and the level-difference portion 23i as shown in FIG. 7A (identical to the intersection line portion 23j in FIG. 7B), though not shown in a portion-enlarged view like FIG. 7B, suppresses a decrease in an angle formed by the raised part 23 and the level-difference portion 23i (identical to the angle θ11 in FIG. 7B) when a static pressure is applied to the rear face panel 22 in the direction indicated by the arrow B. Therefore, this makes it possible to suppress the overall deformation of the raised part 23, thereby improving the robustness of the raised part 23 and the rear face panel 22 including the same.

It should be noted that the number of the wall-thickened portions 22a to the 22c is three in the present embodiment as shown in FIGS. 3 and 4, but the number of the same is not limited to this. For example, as the size of the rear face panel 22 increases, the strength of the rear face panel 22 in the vicinity of the center thereof decreases, whereby the rear face panel 22 more easily deforms when a static pressure is applied thereto. When the shape of the rear face panel 22 is longer in the lateral direction as the aspect ratio of the effective display area of the liquid crystal display 2a is changed to that of a wide screen, such as 16:9, the strength against a static pressure in the lengthwise direction of the rear face panel 22 decreases. In this case, the mechanical strength can be ensured by increasing the number of the wall-thickened portions in the vicinity of the center of the rear face panel 22, or increasing the width of each wall-thickened portion. In contrast, when the rear face panel 22 has a small size, only one wall-thickened portion may be enough to ensure the mechanical strength in some cases.

Further, though the wall-thickened portions 22a to 22c have the same thickness D1 in the present embodiment, they may have different thicknesses. For example, in the case where the rear face panel 22 is in a substantially flat plate shape as in the present embodiment, the center of the rear face panel 22 has a smaller mechanical strength than the surrounding parts thereof. The thicknesses of all the wall-thickened portions 22a to 22c may be increased for increasing the mechanical strength, but this results in an increase in the material costs. Then, the thickness of the wall-thickened portion formed in the vicinity of the center having a smaller mechanical strength (this wall-thickened portion corresponds to the wall-thickened portion 22b in the present embodiment) may be increased, while the thicknesses of the other wall-thickened portions may be decreased as compared with the thickness of the wall-thickened portion in the vicinity of the center, whereby the mechanical strength of the rear face panel 22 can be increased, while using a minimal amount of material. Likewise, though each of the wall-thickened portions 22a to 22c has a uniform thickness in the lengthwise direction in the present embodiment, the wall-thickened portions may have a thickness that varies in the lengthwise direction.

Further, though the first casing 1 and the second casing 2 are pivotally connected by the hinge portion 3 as in a notebook PC, the present embodiment also can be applied to a substantially flat box-shape configuration in which a liquid crystal display and an information processing means such as a CPU are provided in a single casing.

Figure 10:
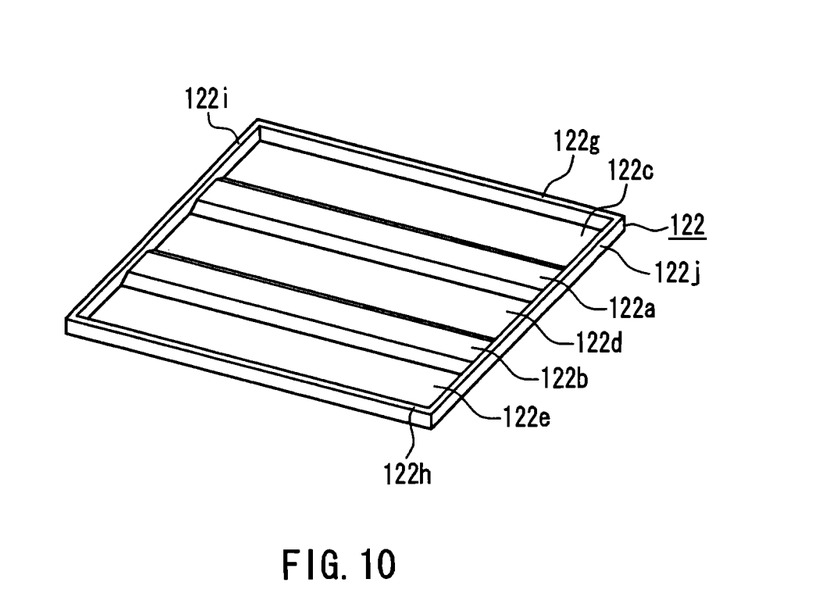
FIG. 10 is a perspective view of an exemplary modification of a rear face panel.

Further, though the wall-thickened portions 22a to 22c are provided in such a manner that the lengthwise direction thereof and the short-side direction of the rear face panel 22 are substantially parallel with each other in the present embodiment, the following configuration may be applicable: wall-thickened portions 122a and 122b are provided in such a manner that a lengthwise direction thereof and a long-side direction of a rear face panel 122 are substantially parallel with each other as shown in FIG. 10 (a perspective view illustrating a modification of the rear face panel). In other words, the wall-thickened portions 122a and 122b may be provided so as to be substantially parallel with a long side 122g and an opposite long side 122h opposite to the foregoing long side 122g of the rear face panel 122 in FIG. 10. The wall-thickened portions 122a and 122b are formed so that ends thereof on one side in the lengthwise direction of the rear face panel 122 reach one short side 122i of the rear face panel 122, while ends thereof on the other side in the lengthwise direction reach the other opposite short side 122j of the rear face panel 122, which is opposite to the short side 122i. It should be noted that in a region in the rear face panel 122 surrounded by the long side 122g, the opposite long side 122h, the short side 122i, and the opposite short side 122j, wall-thinned portions 122c, 122d, and 122e are provided in areas other than areas where the wall-thickened portions 122a and 122b are provided.

This configuration makes it possible to ensure the mechanical strength when the rear face panel 122 is formed in a laterally long shape. More specifically, when the effective display area in the liquid crystal display 2a is increased in size, particularly when the aspect ratio of the enlarged effective display area is changed to that of a wide screen, such as 16:9, the size of the rear face panel 122 has to be increased and/or the shape thereof has to be long in the lateral direction so as to be suitable for the wide screen. Thus, the rear face panel 122 having a larger shape and/or a laterally long shape in accordance with the increase in size or the change to the wide screen shape of the effective display area has a smaller mechanical strength when a static pressure is applied in the direction indicated by the arrow B (see FIG. 4) as compared with the rear face panel 22 of the present embodiment. Then, the mechanical strength, that is, the robustness, of the rear face panel 122 in the long-side direction can be increased when the wall-thickened portions 122a and 122b are provided so as to be substantially parallel with the long side 122g and the opposed long side 122h in FIG. 10. It should be noted that even the rear face panel 122 having the wall-thickened portions 122a and 122b substantially parallel with the long side 122g and the opposed long side 122h in FIG. 10 also can be formed by molding by casting, by flowing a molten material in a direction substantially parallel with the long side 122g and the opposed long side 122h.

Further, the present embodiment is explained by referring to a configuration in which the front face panel 21 is fixed to the rear face panel 22 (122) at a side wall portion thereof by a usual method using screws or the like so that the front face panel 21 comes outside the rear face panel 22 (122); but the rear face panel 22 (122) may be fixed to the front face panel 21 using screws or the like so that the rear face panel 22 (122) comes outside the front face panel 21; or alternatively, the front face panel 21 and the rear face panel 22 (122) may be fixed to each other, while being butted against each other.

Further, the configuration is not limited to that as shown in FIG. 6 in which the rear face panel 22 (122) has one raised part 23, on which the wall-thickened portions 23a to 23c are provided; the wall-thickened portions of the present embodiment may be applicable to a rear face panel having a plurality of raised parts as disclosed in JP 2007-272860 A. With this configuration also, the same effect as that of the present embodiment can be achieved.

Further, the liquid crystal display 2a in the present embodiment is an example of the display panel of the present invention. The rear face panel 22 (122) in the present embodiment is merely an example of a rear face panel of the present invention. The wall-thickened portions 22a, 22b, 22c, 23a, 23b, 23c, 122a, and 122b in the present embodiment are examples of the wall-thickened portions of the present invention. The wall-thinned portions 22d, 22e, 23d, 23e, 122c, 122d, and 122e in the present embodiment are examples of the wall-thinned portions of the present invention. The raised part 23 in the present embodiment is an example of the raised part of the present invention. The level-difference portion 23i in the present embodiment is an example of the level-difference portion of the present invention. The intersection line portion 23j in the present embodiment is an example of the intersection line portion of the present invention.

The present invention is useful for an information processing unit required to have robustness, and is particularly useful for an information processing unit having excellent portability, such as a notebook PC.

The following notes are disclosed regarding the present invention.

[Note 1]
An information processing unit comprising:
a display panel capable of displaying a video image; and
a casing having a rear face panel that covers at least a back side of the display panel, the back side being opposite to a display face of the display panel,
wherein the rear face panel has an opposed face opposed to the display panel, and the opposed face includes a wall-thinned portion having a small thickness, and a wall-thickened portion that is a part of the wall-thinned portion having a thickness increased in a direction toward the display panel, and
the wall-thickened portion is formed continuously from one side to an opposite side of the opposed face, the one side and the opposite side forming a perimeter of the opposed face and being opposite to each other.

[Note 2]
The information processing unit according to Note 1, wherein a ratio of a thickness-direction height of the wall-thickened portion from the opposed face of the wall-thinned portion, with respect to a thickness of the wall-thinned portion, is set at not less than 0.35 and not more than 0.75.

[Note 3]
The information processing unit according to Note 1, wherein the wall-thinned portion has a wall thickness of not less than 0.6 mm and not more than 0.8 mm.

[Note 4]
The information processing unit according to Note 1 or 2, wherein the wall-thickened portion has an inclined face at a boundary with the wall-thinned portion.

[Note 5]
The information processing unit according to Note 1, having a pair of long sides and a pair of short sides, the long sides and the short sides forming the perimeter of the opposed face,
wherein the wall-thickened portion is formed so as to extend from one long side to the other long side of the pair.

[Note 6]
The information processing unit according to Note 1, having a pair of long sides and a pair of short sides, the long sides and the short sides forming the perimeter of the opposed face,
wherein the wall-thickened portion is formed so as to extend from one short side to the other short side of the pair.

[Note 7]
The information processing unit according to Note 1,
wherein the rear face panel has a raised part that is raised with a level-difference portion being interposed therebetween, the level-difference portion being continuous from the one side to the opposite side of the opposed face,
the opposed face in the raised part has a greater distance therefrom to the display panel than a distance from the wall-thinned portion to the display panel, and the wall-thickened portion is formed in the raised part.

[Note 8]
The information processing unit according to Note 7, wherein the wall-thickened portion is formed in the raised part, along an intersection line portion of the raised part and the level-difference portion.

[Note 9]
The information processing unit according to Note 7, wherein the raised part has the wall-thickened portion substantially at a midpoint between a pair of opposite intersection portions.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:
1. An information processing unit comprising:
a display panel capable of displaying a video image; and
a casing having a rear face panel that covers at least a back side of the display panel, the back side being opposite to a display face of the display panel,
wherein the rear face panel has an opposed portion opposed to the display panel, and the opposed portion includes a wall-thinned portion having a small thickness, and a wall-thickened portion that is a part of the wall-thinned portion and has a thickness increased in a direction toward the display panel,
the wall-thickened portion is formed continuously from one side to an opposite side of the opposed portion, the one side and the opposite side forming a perimeter of the opposed portion and being opposite to each other and
the wall-thickened portion has an inclined face at a boundary with the wall-thinned portion.

2. The information processing unit according to claim 1, wherein a ratio of a thickness-direction height of the wall-thickened portion from the opposed portion of the wall-thinned portion, with respect to a thickness of the wall-thinned portion, is set at not less than 0.35 and not more than 0.75.

3. The information processing unit according to claim 1, wherein the wall-thinned portion has a wall thickness of not less than 0.6 mm and not more than 0.8 mm.

4. The information processing unit according to claim 2, wherein the wall-thickened portion has an inclined face at a boundary with the wall-thinned portion.

5. The information processing unit according to claim 1, having a pair of long sides and a pair of short sides, the long sides and the short sides forming the perimeter of the opposed portion,
wherein the wall-thickened portion is formed so as to extend from one long side to the other long side of the pair.

6. The information processing unit according to claim 1, having a pair of long sides and a pair of short sides, the long sides and the short sides forming the perimeter of the opposed portion,
wherein the wall-thickened portion is formed so as to extend from one short side to the other short side of the pair.

7. The information processing unit according to claim 1,
wherein the rear face panel has a raised part that is raised on a rear face side with a level-difference portion being interposed therebetween, the level-difference portion being continuous from the one side to the opposite side of the opposed portion,
the opposed portion in the raised part has a greater distance therefrom to the display panel than a distance from a remaining portion of the opposed portion to the display panel, and
the wall-thickened portion is formed in the raised part.

8. The information processing unit according to claim 7, wherein the wall-thickened portion is formed in the raised part, along an intersection line portion of the raised part and the level-difference portion.

9. The information processing unit according to claim 7, wherein the raised part has the wall-thickened portion substantially at a midpoint between a pair of opposite intersection portions.

10. The information processing unit according to claim 1, the rear face panel of the casing has a second face that is an external face of the information processing unit.

11. The information processing unit according to claim 10, wherein the wall-thickened portion of the rear face panel is opposed to the display panel without an intervening member.

* * * * *